US012189721B2

United States Patent
Ni et al.

(10) Patent No.: US 12,189,721 B2
(45) Date of Patent: Jan. 7, 2025

(54) IMAGE PROCESSING METHOD, COMPUTER SYSTEM, ELECTRONIC DEVICE, AND PROGRAM PRODUCT

(71) Applicant: EMC IP Holding Company LLC, Hopkinton, MA (US)

(72) Inventors: Jiacheng Ni, Shanghai (CN); Min Gong, Shanghai (CN); Guangzhou Zhou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 263 days.

(21) Appl. No.: 17/385,700

(22) Filed: Jul. 26, 2021

(65) Prior Publication Data

US 2022/0343120 A1     Oct. 27, 2022

(30) Foreign Application Priority Data

Apr. 23, 2021 (CN) .......................... 202110441310.7

(51) Int. Cl.
    *G06N 3/08*             (2023.01)
    *G06F 18/21*           (2023.01)
    *G06F 18/24*           (2023.01)

(52) U.S. Cl.
    CPC ............ *G06F 18/24* (2023.01); *G06F 18/217* (2023.01); *G06N 3/08* (2013.01)

(58) Field of Classification Search
    CPC .......... G06F 18/24; G06F 18/217; G06N 3/08
See application file for complete search history.

(56) References Cited

U.S. PATENT DOCUMENTS 10,242,443 B2 * 3/2019 Hsieh .................... G06T 7/0012
10,262,240 B2 * 4/2019 Guo ..................... G06V 10/764
(Continued)

FOREIGN PATENT DOCUMENTS

CN         111368219 A      7/2020

OTHER PUBLICATIONS

Notice of Allowance received for U.S. Appl. No. 17/364,814 dated Aug. 9, 2023, 69 pages.
(Continued)

*Primary Examiner* — Chan S Park
*Assistant Examiner* — D J Dhooge
(74) *Attorney, Agent, or Firm* — Amin, Turocy & Watson, LLP

(57) ABSTRACT

Image processing is described. An example method includes generating a feature extraction layer portion of an image classification model based on a deep neural network (DNN) model, and extracting features of a group of images by using the feature extraction layer portion. The method further includes training an output layer portion of the image classification model according to the features of training images in the group of images and classification labels of the training images. The method further includes generating the image classification model by combining the feature extraction layer portion and the output layer portion. Embodiments of the present disclosure implement a lightweight artificial intelligence (AI) solution on a storage system. An expanded storage system can facilitate the generation of AI applications and assist in training an image classification model more quickly, and the obtained image classification model can also produce high accuracy on a small training set.

20 Claims, 5 Drawing Sheets

(56) References Cited

U.S. PATENT DOCUMENTS

| | | | |
|---|---|---|---|
| 10,360,499 B2* | 7/2019 | Kumar | G16B 40/20 |
| 10,467,501 B2* | 11/2019 | N | G06V 10/752 |
| 10,742,399 B2* | 8/2020 | Chen | G06V 40/161 |
| 11,429,813 B1 | 8/2022 | Aghoram Ravichandran et al. | |
| 2007/0150801 A1 | 6/2007 | Chidlovskii et al. | |
| 2016/0162464 A1 | 6/2016 | Munro et al. | |
| 2016/0196250 A1 | 7/2016 | Allen et al. | |
| 2019/0318405 A1 | 10/2019 | Hu et al. | |
| 2020/0019617 A1 | 1/2020 | Eswaran et al. | |
| 2020/0286002 A1 | 9/2020 | Szanto et al. | |
| 2020/0286105 A1 | 9/2020 | Joseph et al. | |
| 2021/0042291 A1 | 2/2021 | Banipal et al. | |
| 2022/0180252 A1 | 6/2022 | Marvaniya et al. | |

OTHER PUBLICATIONS

Final Office Action received for U.S. Appl. No. 17/364,803, dated Jan. 26, 2024, 143 pages.

"Faiss—A library for efficient similarity search and clustering of dense vectors" [https://github.com/facebookresearch/faiss] GitHub, retrieved Sep. 27, 2022, 5 pages.

"Bidirectional Encoder Representations from Transformers (BERT)". [https://tfhub.dev/google/bert_uncased_L-12_H-768_A-12/1] TensorFlow Hub, retrieved Sep. 27, 2022, 1 page.

"Keras Applications". [https://keras.io/api/applications], Keras, retrieved Sep. 27, 2022, 1 page.

Al Aghbari, Z, et al. 2020. SparkNN: A Distributed In-Memory Data Partitioning for KNN Queries on Big Spatial Data. Data Science Journal, 19: 35, pp. 1-14. Aug. 2020. DOI: https://doi.org/10.5334/dsj-2020-035 [https://datascience.codata.org/articles/10.5334/dsj-2020-035/].

Saikia, J, et al."K-Nearest Neighbor Hardware Accelerator Using In-Memory Computing SRAM" [https://ieeexplore.ieee.org/document/8824822], 2019 IEEE/ACM International Symposium on Low Power Electronics and Design (ISLPED), 6 pages.

"Long abstracts of Wikipedia" [https://databus.dbpedia.org/dbpedia/text/long-abstracts/2020.07.01] Databus, Jul. 1, 2020, retrieved Sep. 27, 2022, 4 pages.

AI Platform Data Labeling Service [https://cloud.google.com/ai-platform/data-labeling/pricing] Google Cloud, retreived Sep. 27, 2022, 4 pages.

B. Settles. "Active Learning Literature Survey". Computer Sciences Technical Report 1648, University of Wisconsin-Madison. 2009. 47 pages.

D. Lewis and W. Gale. "A sequential algorithm for training text classifiers". In Proceedings of the ACM SIGIR Conference on Research and Development in Information Retrieval, ACM/Springer, 1994.10 pages.

Gong et al. "Method, Device, and Computer Program Product for File Annotation" U.S. Appl. No. 17/364,814, filed Jun. 30, 2021, 26 pages.

"Gong et al. ""A Method for Processing Data, an Electronic Device, and Acomputer Program Product"", U.S. Appl. No. 17/364,803, filed Jun. 30, 2021, 28 pages."

Non Final Office Action received for U.S. Appl. No. 17/364,803 dated Aug. 11, 2022 , 17 pages.

Final Office Action received for U.S. Appl. No. 17/364,803 dated Mar. 7, 2023 , 56 pages.

Non Final Office Action received for U.S. Appl. No. 17/364,814 dated Jan. 25, 2023, 104 pages.

Settles et al., "Active learning with real annotation costs." Proceedings of the NIPS workshop on cost-sensitive learning, vol. 1, 2008, 10 pages.

Baldridge et al. "Active learning and the total cost of annotation." Proceedings of the 2004 Conference on Empirical Methods in Natural Language Processing, 2004, 8 pages.

Notice of Allowance received for U.S. Appl. No. 17/364,814 dated Nov. 21, 2023, 6 pages.

Non-Final Office Action received for U.S. Appl. No. 17/364,803 dated Oct. 13, 2023, 60 pages.

Notice of Allowance received for U.S. Appl. No. 17/364,814 dated Aug. 30, 2023, 6 pages.

Non-Final Office Action received for U.S. Appl. No. 17/364,803 dated Aug. 1, 2024, 62 pages.

* cited by examiner

IMAGE PROCESSING METHOD, COMPUTER SYSTEM, ELECTRONIC DEVICE, AND PROGRAM PRODUCT

RELATED APPLICATION

The present application claims the benefit of priority to Chinese Patent Application No. 202110441310.7, filed on Apr. 23, 2021, which application is hereby incorporated into the present application by reference herein in its entirety.

TECHNICAL FIELD

Embodiments of the present disclosure relate to the field of computers and, more particularly, to an image processing method, a computer system, an electronic device, a computer-readable storage medium, and a computer program product.

BACKGROUND

Deep learning has revolutionized artificial intelligence (AI). Many complex problems that have existed in the AI field for many years are solved by deep learning. Usually, deep neural network (DNN) models are trained on graphics processing units (GPUs) deployed on cloud servers, and then the trained DNN models may be used to support specific services, such as image recognition, speech processing, and text processing.

The development of deep learning algorithms has brought opportunities and challenges to storage systems. Traditionally, people only use storage systems to store "data bytes" themselves instead of "data context," lacking a high-level understanding of data. In data mining, storage systems are only regarded as data containers, which hinders the storage systems from deeply participating in AI workflows. Therefore, a technology that can fill gaps between the storage systems and the AI workflows is needed.

SUMMARY

The present disclosure provides a solution for implementing a lightweight AI solution on a storage system to assist in generating AI applications.

According to a first aspect of the present disclosure, an image processing method is provided, including: generating a feature extraction layer portion of an image classification model based on a DNN model; extracting features of a group of images by using the feature extraction layer portion; training an output layer portion of the image classification model according to the features of training images in the group of images and classification labels of the training images; and generating the image classification model by combining the feature extraction layer portion and the output layer portion.

According to a second aspect of the present disclosure, a computer system is also provided, including: a feature extraction unit, including at least a portion of a DNN model and configured to extract features of a group of images; and an image classification model generation unit, configured to train an output layer portion of an image classification model according to the features of training images in the group of images and labels of the training images, and generate the image classification model by combining the at least a portion of the DNN model and the output layer portion of the trained image classification model.

According to a third aspect of the present disclosure, an electronic device is also provided, including: at least one processing unit; and at least one memory that is coupled to the at least one processing unit and stores instructions for execution by the at least one processing unit, where the instructions, when executed by the at least one processing unit, cause the electronic device to perform the method according to the first aspect of the present disclosure.

According to a fourth aspect of the present disclosure, a computer-readable storage medium is also provided, including machine-executable instructions that, when executed by a device, cause the device to perform the method according to the first aspect of the present disclosure.

According to a fifth aspect of the present disclosure, a computer program product is also provided, including machine-executable instructions that, when executed by a device, cause the device to perform the method according to the first aspect of the present disclosure.

In this way, a storage system can be expanded to facilitate the generation of AI applications and assist in training an image classification model more quickly, and the obtained image classification model can also produce high accuracy on a small training set.

It should be understood that the Summary section is neither intended to identify key or essential features of the embodiments of the present disclosure, nor intended to limit the scope of the present disclosure. Other features of the present disclosure will become readily understandable from the following description.

BRIEF DESCRIPTION OF THE DRAWINGS

The above and other objectives, features, and advantages of the embodiments of the present disclosure will become more readily understandable through the following detailed description with reference to the accompanying drawings. In the accompanying drawings, a plurality of embodiments of the present disclosure will be illustrated by way of example and not limitation, where.

DETAILED DESCRIPTION

Figure 1:
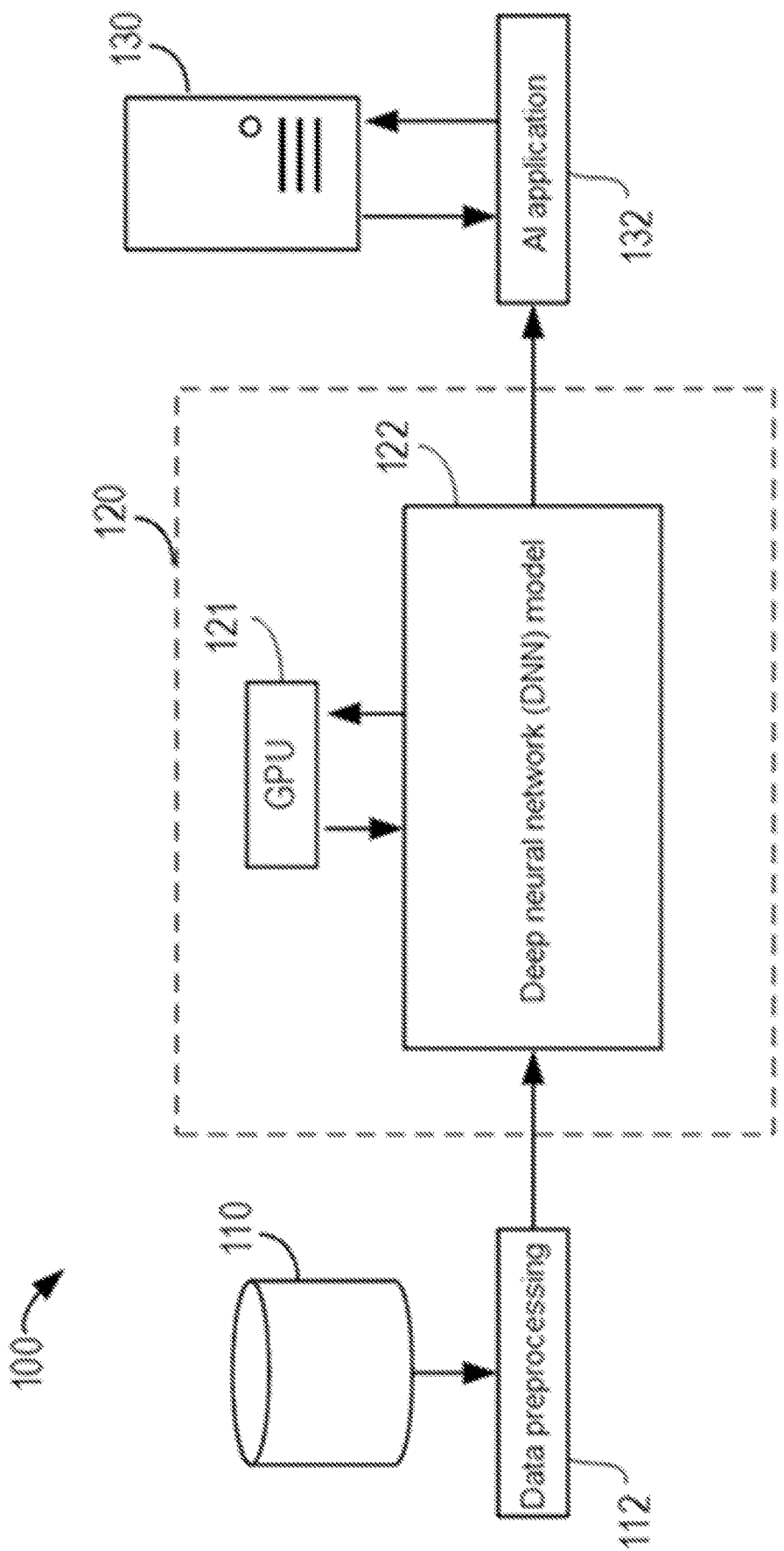
FIG. 1 shows a schematic diagram of a conventional framework for generating AI applications by using a storage system.

The concept of the present disclosure will now be illustrated with reference to various example embodiments shown in the accompanying drawings. It should be understood that these embodiments are described only for the purpose of enabling a person skilled in the art to better understand and then implement the present disclosure, instead of limiting the scope of the present disclosure in any way. It should be noted that similar or identical reference signs may be used in the drawings where feasible, and similar or identical reference signs may indicate similar or identical elements. Those skilled in the art will understand that from the following description, alternative embodiments of the structures and/or methods described herein may be adopted without departing from the principles and concepts of the present disclosure described.

In the context of the present disclosure, the term "including" and its various variants may be understood as open-ended terms meaning "including but not limited to"; the term "based on" may be understood as "at least partially based on"; the term "an embodiment" may be understood as "at least one embodiment"; and the term "another embodiment" may be understood as "at least one other embodiment." Other terms that may appear but are not mentioned here, unless explicitly stated, should not be interpreted or limited in a manner that is contrary to the concept on which the embodiments of the present disclosure are based.

Basic principles and implementations of the present disclosure are illustrated below with reference to the drawings. It should be understood that example embodiments are provided only to enable those skilled in the art to better understand and then implement the embodiments of the present disclosure, and not to limit the scope of the present disclosure in any way.

As described above, traditionally, storage systems are only used to store "data bytes" themselves instead of "data context," lacking a high-level understanding of data. As AI applications become more and more widespread, the development of storage systems is limited. For example, in order to create specific AI tasks, such as face recognition, a large amount of face data stored in storage systems will be used to train DNN models. The DNN models can implicate or need to obtain a large amount of training data from the storage systems, and it takes a lot of computing resources and time to train the DNN models.

FIG. 1 shows a schematic diagram of conventional framework 100 for generating AI applications by using a storage system. After data in storage system 110 undergoes data preprocessing 112, the data is input to DNN model 122. DNN model 122 is trained by a parallel computing unit, such as GPU 121, to generate AI application 132. Then, AI application 132 may be deployed to server 130 in the cloud.

In order to generate DNN model 122 of a specific task, a portion of data is selected from storage system 110, and labeled manually or in other ways to form training data. DNN model 122 adjusts internal parameters iteratively through, for example, a gradient descent algorithm, so that the trained DNN model can best fit the training data. Depending on the number of layers of DNN model 122, the number of nodes in each layer, and the number of connections between layers, DNN model 122 may have millions or even hundreds of millions of parameters. Therefore, the cost of training from zero is high for the DNN model for each specific task. In addition, it can be seen that storage system 110 is only used as a data source in the process of generating AI application 132, which limits the development of the storage system.

According to the embodiments of the present disclosure, a general DNN model may be trained on a large comprehensive data set, and then the pre-trained DNN model may be used as a feature extractor available for a plurality of specific tasks. The feature extractor may be deployed in the storage system to expand the storage system. By taking an image processing application as an example, the following describes the technology provided according to the present disclosure with reference to FIGS. 2 to 6.

Figure 2:
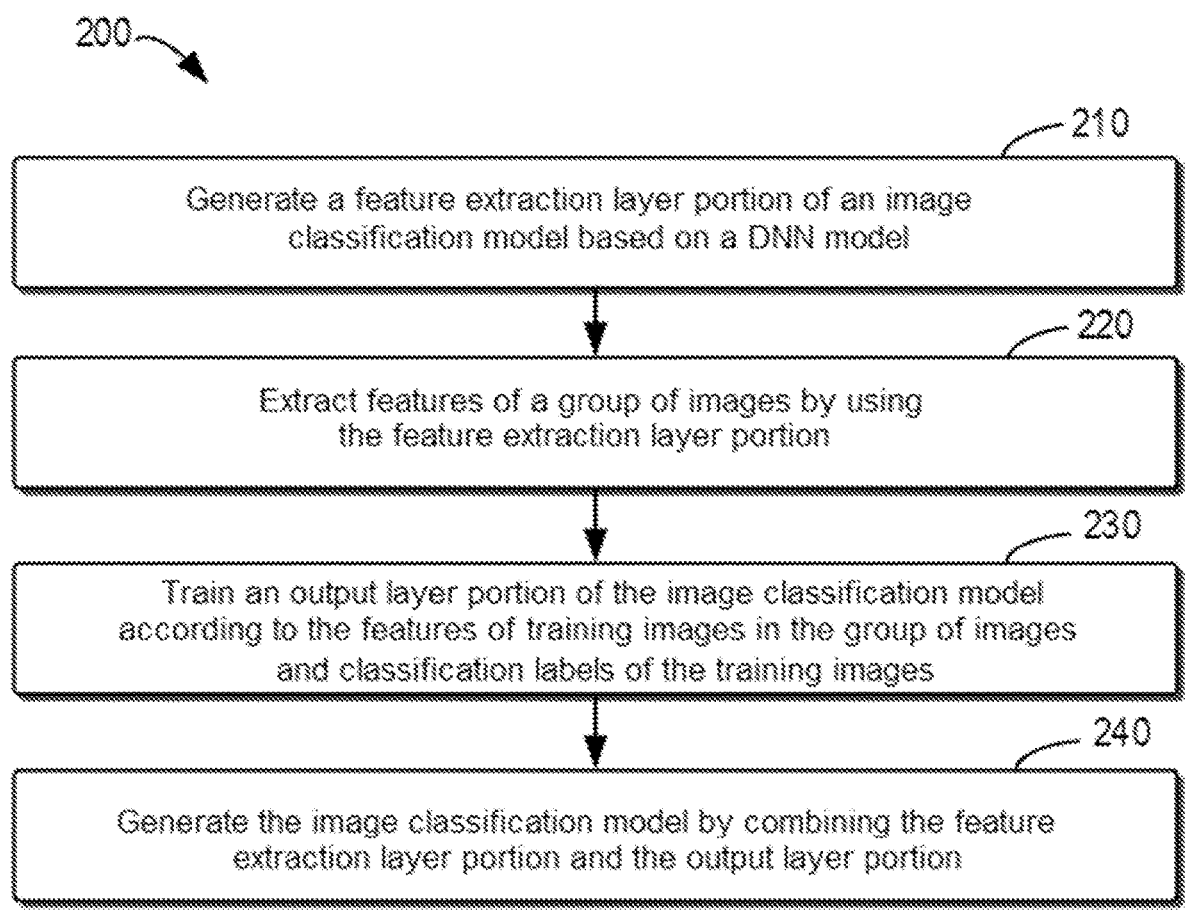
FIG. 2 shows a schematic flow chart of an image processing method according to embodiments of the present disclosure.

FIG. 2 shows a schematic flow chart of image processing method 200 according to embodiments of the present disclosure. Image processing method 200 may be implemented in combination with a storage system storing various images, and is used to create an image classification model for a specific task.

At block 210, a feature extraction layer portion of an image classification model is generated based on a DNN model. The image classification model may be used for specific tasks, for example, image recognition within a certain range, such as face recognition. According to the embodiments of the present disclosure, the DNN model may be a pre-trained comprehensive DNN model. Just as an example, an Inception-Resnet-V2 model may be trained on a CASIA-web-face dataset. The CASIA-web-face dataset is a network face database of approximately 4G, wherein face data may be applied to face verification and recognition, and includes 494,000 images involving 10,500 people. The trained Inception-Resnet-V2 model has 55,873,736 model parameters and 572 layers. It should be understood that any other suitable DNN model may be used and trained on any comprehensive database, and the image classification model is not limited to face recognition applications.

According to the embodiments of the present disclosure, the feature extractor can be separated from the pre-trained DNN model, and the feature extractor can be combined into the storage system. This will be described below with reference to FIG. 3.

Figure 3:
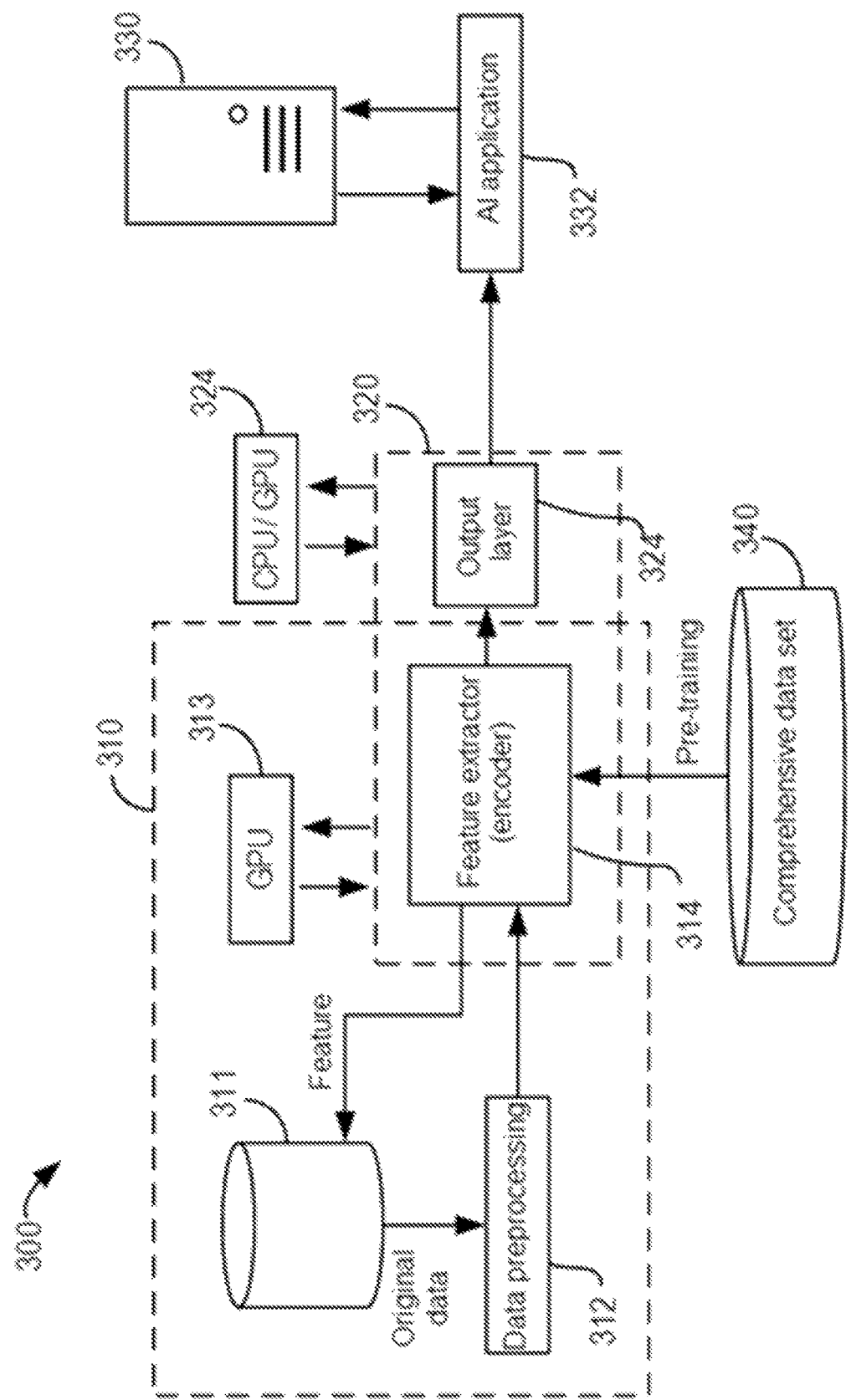
FIG. 3 shows a schematic diagram of a framework for generating AI applications using a storage system according to embodiments of the present disclosure.

FIG. 3 shows a schematic diagram of framework 300 for generating AI applications using a storage system according to embodiments of the present disclosure. As shown in the figure, framework 300 generally includes storage system 310, DNN model 320, and server 330 on which AI applications are deployed. Compared with traditional storage system 110, storage system 310 further includes a portion of the DNN model, that is, feature extraction layer 314. Feature extraction layer 314 may be packaged as a separate module. From the perspective of storage system 310, packaged feature extraction layer 314 is regarded as feature extractor or encoder 314 for extracting features of data from data such as images. The features may usually be vectors with several dimensions that represent data context, and are used in AI applications including DNN models to generate inferences about the data, such as face recognition.

In some embodiments, DNN model 320 may be pre-trained from comprehensive data set 340, for example, the aforementioned Inception-Resnet-V2 model is trained on the CASIA-web-face data set. In some application scenarios, there may be some images in storage device 311 of storage system 310 to classify, and these images may not have been learned by any existing deep learning model. Therefore, corresponding image classification models are to be generated for specific tasks. According to the embodiments of the present disclosure, a portion of layers may be separated from pre-trained DNN model 320 to be used as a feature extraction layer for a specific task, for example, feature extraction layer 314. In some embodiments, pre-trained DNN model 320 may have more categories than the desired image classification model, so as to ensure that feature extraction layer 314 may extract richer contexts to guarantee the accuracy of the image classification model during inference.

Figure 4:
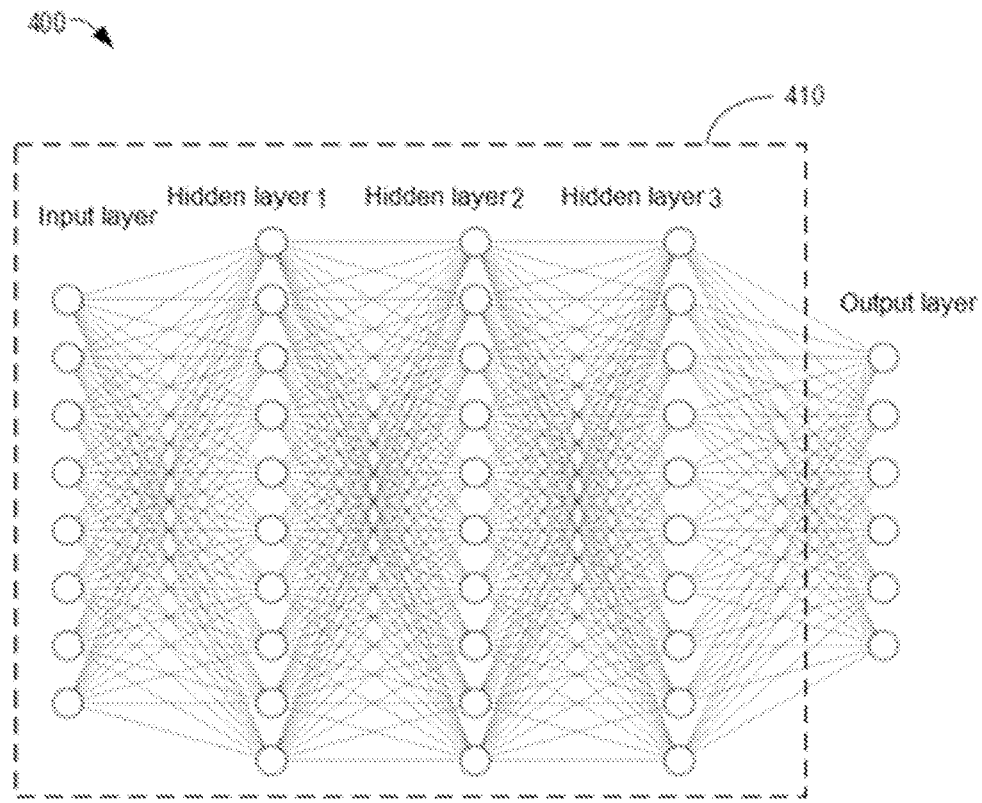
FIG. 4 shows a schematic diagram of generating a feature extraction layer from a DNN model according to embodiments of the present disclosure.

FIG. 4 shows a schematic diagram of generating a feature extraction layer from a DNN model according to embodiments of the present disclosure. FIG. 4 only schematically shows a general structure of a DNN, but it should be understood that the DNN model may have other structures. As shown in the figure, DNN module 400 includes an input layer, one or more hidden layers, and an output layer. Each layer has several nodes, and each node receives the output of a previous layer of nodes and generates the output to a lower layer of nodes. The output of each layer is regarded as a vector. Generally, the number of nodes in the input layer may correspond to the dimension of a vector input to DNN model 400, and the number of nodes in the output layer may correspond to the dimension of an output vector, for example, the number of categories corresponding to a specific task. The output vector of the output layer may be used to indicate a classification probability of an input vector after being normalized. According to the embodiments of the present disclosure, a portion or all of the layers prior to the output layer may be regarded as feature extraction layer 410. The output layer located after the feature extraction layer generates classification results based on the output vector of the feature extraction layer.

In some embodiments, feature extraction layer 410 is generated based on a portion of the pre-trained DNN model and deployed to storage system 310 as feature extractor or encoder 314. In some embodiments, the output vector of feature extractor 314 may be a 512-dimensional vector representing an input image. Feature extractor 314 may be configured to process an image in storage device 311 of storage system 310 to generate corresponding features.

Referring back to FIG. 2, at block 220, features of a group of images are extracted by using the feature extraction layer portion. In some embodiments, storage system 310 may use feature extractor 314 to extract features of image data in storage device 311 when new image data is received, in response to a request, or periodically. For different request types, feature extractor 314 generates features in different ways. For example, for a request for a single instance, feature extractor 314 is called immediately to return the feature vector of the requested image. For a request for a small batch of instances, feature extractor 314 may be called through a streaming framework. For a request for a large data set, feature extractor 314 may be called offline by a large-scale distributed system such as Hadoop/Spark. In other words, the features of the image may be updated with different timeliness and efficiency.

Specifically, as shown in FIG. 3, an original image from storage device 311 is sent to feature extractor 314 after data preprocessing 312. Feature extraction layer 314 deployed in storage system 310 may generate the features of these original image data. In some embodiments, the features may be stored to storage device 311 of storage system 310. In this way, when training an image classification model for a specific task, storage device 311 may be directly accessed to acquire the features of the training images, that is, the original feature extraction operation is skipped.

It should be understood that since the parameters of the feature extraction layer are far more than the parameters of the output layer, keeping the parameters of the feature extraction layer of the image classification model unchanged and only training the parameters of the output layer can greatly save computing resources.

In addition, using feature extractor 314 in storage system 310 to extract features from an image is a portion of a DNN model that can implicate or require many computing resources. In this case, storage system 310 may include a high-performance computing unit, and parallel computing unit 313 such as a GPU would be beneficial.

Referring back to FIG. 2, at block 230, an output layer portion of the image classification model is trained according to the features of training images in the group of images and classification labels of the training images. The output layer portion is added to the feature extraction layer based on the pre-trained DNN model to form the image classification model. The output layer portion may be a relatively simple model such as SoftMax, a support vector machine, or a logistic regression model.

Then, parameters of the output layer of the image classification model are adjusted according to the features of training images and labels of the training images in the group of images. As described above, the features of the training images may be extracted in advance and stored in storage device 311 of storage system 310. In some embodiments, the features of the training images may be acquired by accessing the stored features of the training images. Alternatively, if storage device 311 does not store the features of the training images, the feature extraction layer may be used to extract the features in real time.

The feature extraction layer of the image classification model may be obtained directly from feature extractor 314 of storage system 310, for example, by copying. In some embodiments, the parameters of the feature extraction layer of the image classification model may be kept unchanged during the training, thereby improving the speed of training the image classification model. According to the embodiments of the present disclosure, the computing resources implicated or required for training output layer 324 are far less than the resources implicated or required for training the entire image classification model. Therefore, even general processor 324, such as a central processing unit (CPU), may be used during the training process, but a parallel processor such as a GPU may also be used.

At block 240, the image classification model is generated by combining the feature extraction layer portion and the output layer portion. After the output layer portion of the image classification model is trained, the feature extractor deployed in storage system 310 may be used as the feature extraction layer portion which is combined with the output layer to form a complete image classification model, and the training process is ended. Then, the image classification model is deployed on server 330 as an AI application for classification inference.

In some embodiments, after output layer portion 324 is trained, image classification model 320 may also be finely adjusted. Specifically, different from training the parameters of output layer 324 while keeping the parameters of the feature extraction layer unchanged, the parameters of the feature extraction layer and the output layer may be adjusted at the same time during the fine adjustment process. In some embodiments, the original data of the training images and the classification labels of the training images may be used to finely adjust the image classification model. In this case, parallel computing unit 313, such as a GPU, is introduced into storage system 310 to perform training of a complete graphics classification model. This mode of training in stages, that is, first training output layer 324 and then adjusting the parameters of feature extraction layer 314, is generally faster than directly training complete image classification model 320, and can better fit the training data.

Through the above descriptions, the embodiments of the present disclosure implement a lightweight AI solution on a storage system. The expanded storage system can facilitate the generation of AI applications and assist in training an image classification model more quickly, and the obtained image classification model can also produce high accuracy on a small training set.

Figure 5:
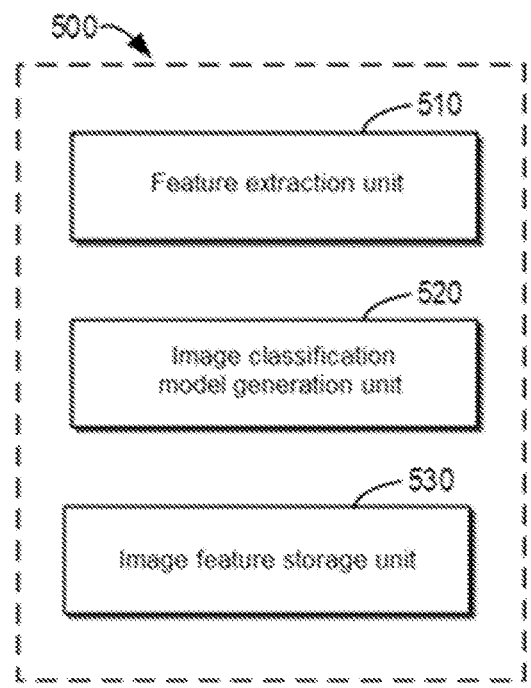
FIG. 5 shows a schematic block diagram of a computer system according to embodiments of the present disclosure.

FIG. 5 shows a schematic block diagram of computer system 500 according to embodiments of the present disclosure. As shown in the figure, computer system 500 includes feature extraction unit 510, image classification model generation unit 520, and image feature storage unit 530.

Feature extraction unit 510 includes a portion of DNN model 320 for extracting features of a group of images. In some embodiments, feature extraction unit 510 may be obtained based on DNN model 320. For example, feature extraction unit 510 may be generated by packaging a portion of pre-trained DNN model 320, such as feature extraction layer 314. Here, feature extraction layer 314 refers to a portion remaining after output layer 324 of DNN model 320 is removed. In addition, DNN model 320 may be a pre-trained model trained on comprehensive data set 340, for example but not limited to, the aforementioned Inception-Resnet-V2 trained on a CASIA-web-face data set. Feature extraction unit 510 may be included or deployed in storage system 310. Thus, feature extraction unit 510 may extract features from stored images by accessing storage device 311 of storage system 310. Alternatively, when storage system 310 receives an external image, feature extraction unit 510 may also extract features from the received image.

Image classification model generation unit 520 is configured to train output layer portion 324 of an image classification model associated with a specific task according to the features of the image extracted by feature extraction unit 510 and labels of training images. In some embodiments, a portion of images stored in storage device 311 may be used to train the image classification model associated with a specific task, and these images are labeled manually or in other ways. In this case, output layer portion 324 of image classification model 320 may be trained by using the features of these extracted training images and labels thereof. It should be understood that since the features of the image have been extracted or generated, a feature extraction layer of the image classification model may be bypassed, and only output layer 324 is trained. In some embodiments, output layer portion 324 has a smaller number of nodes than the trained DNN model. In other words, pre-trained DNN model 320 has more categories than the image classification model. Therefore, the feature extraction layer may ensure that a richer context is extracted to guarantee the accuracy of the image classification model during inference.

Image classification model generation unit 520 is configured to generate the image classification model based on at least a portion of the DNN model and the output layer portion of the trained image classification model. Feature extraction layer 324 constituting feature extraction unit 510 is combined with trained output layer 314 to form a trained image classification model. The obtained image classification model may be deployed to server 330 as an AI application.

Computer system 500 further includes image feature storage unit 530. Image feature storage unit 530 is configured to store the features of the image extracted by feature extraction unit 510. Therefore, feature extraction unit 510 may operate offline. For example, when storage system 310 is not busy or responds to a request for a large data set, feature extraction unit 510 extracts and stores the features of the image offline for subsequent direct access. Therefore, when the image classification model is requested, or needs, to be generated, image classification model generation unit 520 obtains the features of an associated image by accessing image feature storage unit 530.

Optionally, after the output layer of the image classification model is trained, image model generation unit 520 may also use the training images and the classification labels of the training images to further finely adjust the image classification model. At this moment, a portion of the pre-trained DNN model contained in feature extractor 314 may be copied from feature extraction unit 510 and combined with trained output layer portion 324, and then the combined image classification model may be trained. As described above, the training process implicates or requires more computing resources, so a parallel computing unit such as a GPU is deployed in storage system 310. Image classification model generation unit 520 uses the GPU to adjust parameters of feature extraction layer portion 314 and output layer portion 324 of the image classification model. Here, the extracted features of the training images are not used, but original data of the training images is used for training.

Figure 6:
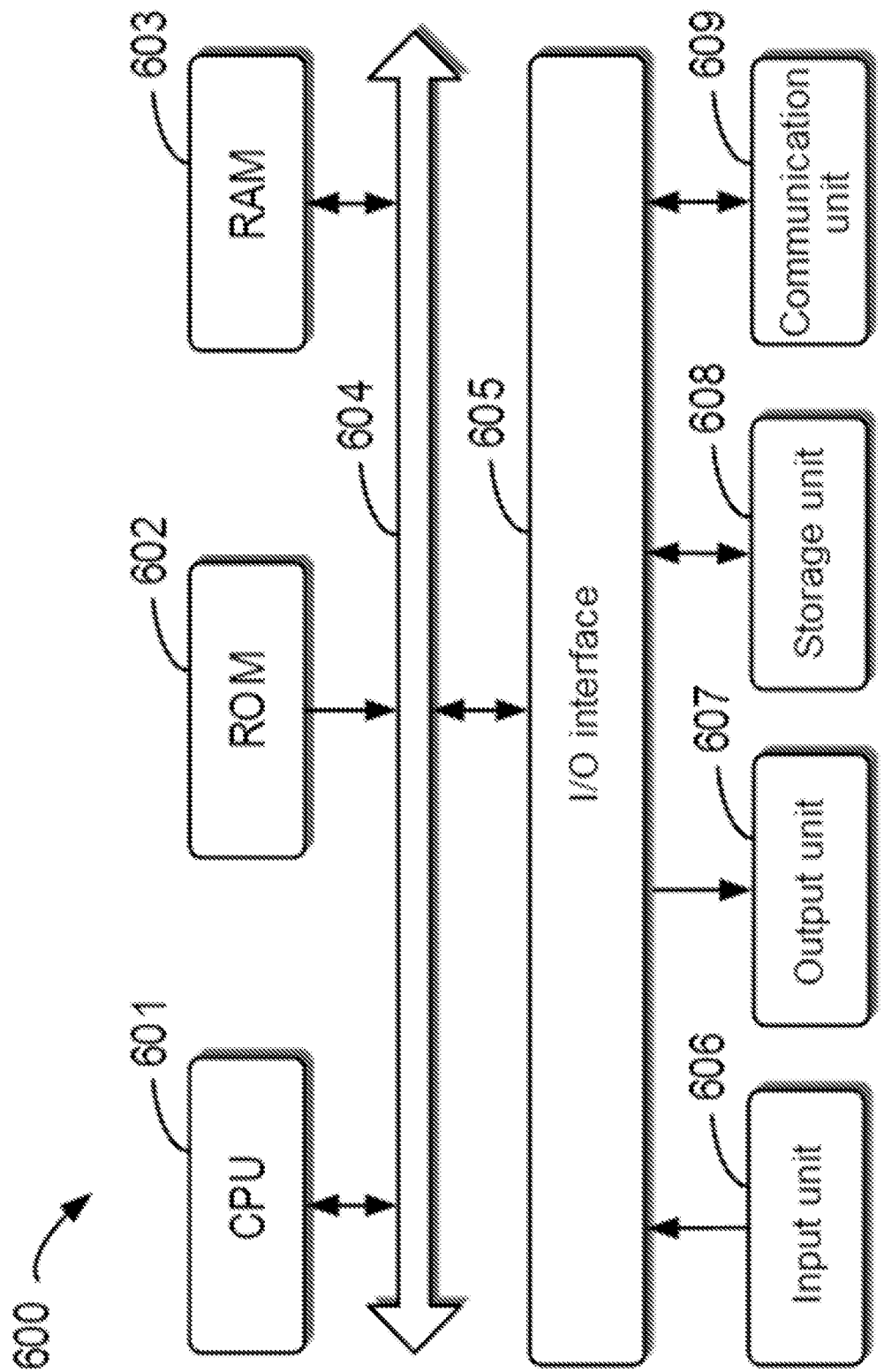
FIG. 6 shows a schematic block diagram of an example device that may be used to implement embodiments of the present disclosure.

FIG. 6 shows a schematic block diagram of example device 600 that may be used to implement embodiments of the present disclosure. For example, the image processing method and the computer system according to the embodiments of the present disclosure may be both implemented by device 600. As shown in the drawing, device 600 includes CPU 601 that may perform various appropriate actions and processing according to computer program instructions stored in read-only memory (ROM) 602 or computer program instructions loaded from storage unit 608 into random access memory (RAM) 603. In RAM 603, various programs and data required for operations of device 600 may also be stored. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as an Internet and/or various telecommunication networks.

The various processes and processing described above, such as method 200, may be executed by processing unit 601. For example, in some embodiments, method 200 may be implemented as a computer software program that is tangibly included in a machine-readable medium, such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including an object oriented programming language, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

What is claimed is:

1. A method, comprising:

training, by a system comprising a processor, a first deep neural network (DNN) model for image classification of a group of categories of images, wherein the first DNN model comprises a feature extraction layer portion and a first output layer portion, and wherein the feature extraction layer portion only comprises an input layer and one or more hidden layers, and does not comprise any output layers of the first DNN model;

extracting, by the system, the feature extraction layer portion from the first DNN model;

incorporating, by the system, the feature extraction layer portion as an executable module in a storage device of the system;

extracting, by the system, using the feature extraction layer portion in the storage device, respective features of images stored in the storage device;

storing, by the system, in the storage device, the respective features of the images;

retrieving, by the system, from the storage device, the respective features of training images in the images, wherein the training images are associated with a sub-group of the group of categories of images;

training, by the system, a second output layer portion for image classification of the sub-group of the group of categories of images, based on the respective features of the training images and according to classification labels of the training images, wherein the training of the second output layer portion does not comprise training the feature extraction layer portion; and generating, by the system, a second DNN model for image classification of the sub-group of the group of categories of images by combining the feature extraction layer portion and the second output layer portion.

2. The method according to claim 1, wherein the first DNN model is trained using a subset of the images.

3. The method according to claim 1, further comprising:
receiving, by the system, a new image; and
classifying, by the system, using the second DNN model, the new image.

4. The method according to claim 1, further comprising:
receiving, by the system, additional training images; and
extracting, by the system, using the feature extraction layer portion, respective features of the additional training images,
wherein the training of the second output layer portion comprises training the second output layer portion based further on the respective features of the additional training images.

5. The method according to claim 1, further comprising:
adjusting, by the system, the feature extraction layer portion and the second output layer portion of the second DNN model based on the training images and the classification labels of the training images.

6. The method according to claim 5, wherein adjusting the feature extraction layer portion and the output layer portion of the second DNN model comprises:
training the second DNN model by using original data of the training images and the classification labels.

7. A system, comprising:
at least one storage device;
at least one processing unit; and
at least one memory that is coupled to the at least one processing unit and stores instructions for execution by the at least one processing unit, the at least one processing unit comprising:

an image classification model generation unit, configured to train a first deep neural network (DNN) model for image classification of a group of categories of images, wherein the first DNN model comprises a feature extraction layer portion and a first output layer portion, and wherein the feature extraction layer portion comprises an input layer and one or more hidden layers, and does not comprise any output layers of the first DNN model; and a feature extraction unit configured to:
extract the feature extraction layer portion from the first DNN model;
incorporate the feature extraction layer portion as an executable module in the at least one storage device of the system; and
extract, using the feature extraction layer portion in the at least one storage device, respective features of images stored in the at least one storage device;
storing, in the at least one storage device, the respective features of the images; and wherein image classification model generation unit is further configured to:
retrieve, from the storage device, the respective features of training images in the images, wherein the training images are associated with a sub-group of the group of categories of images;
train a second output layer portion for image classification of the sub-group of the group of categories of images, based on the respective features of the training images and according to classification labels of the training images, wherein the training of the second output layer portion does not comprise training the feature extraction layer portion; and
generate a second DNN model for image classification of the sub-group of the group of categories of images by combining the feature extraction layer portion and the second output layer portion.

8. The system according to claim 7, wherein the first DNN model is trained using a subset of the images.

9. The system according to claim 7, wherein the image classification model generation unit is further configured to:
receive a new image; and
classify, using the second DNN model, the new image.

10. The system according to claim 7, wherein the image classification model generation unit is further configured to:
receive additional training images;
extract, using the feature extraction layer portion, respective features of the additional training images; and
train the second output layer portion based further on the respective features of the additional training images.

11. The system according to claim 7, wherein the image classification model generation unit is further configured to further adjust the feature extraction layer portion and the second output layer portion of the second DNN model based on the training images and the classification labels of the training images.

12. The system according to claim 11, wherein the image classification model generation unit is further configured to train the second DNN model by using original data of the training images and the classification labels.

13. The system according to claim 11, wherein the image classification model is further configured to adjust the feature extraction layer portion and the output layer portion of the second DNN model by using at least one graphics processing unit.

14. A non-transitory computer-readable medium, comprising machine-executable instructions that, in response to execution by a system comprising a processor, cause the device to perform operations, comprising:
- training a first deep neural network (DNN) model for image classification of a group of categories of images, wherein the first DNN model comprises a feature extraction layer portion and a first output layer portion, and wherein the feature extraction layer portion comprises an input layer and one or more hidden layers, and does not comprise any output layers of the first DNN model;
- extracting the feature extraction layer portion from the first DNN model;
- incorporating the feature extraction layer portion as an executable module in a storage device of the system;
- extracting, using the feature extraction layer portion in the storage device, a group of features of respective features of images stored in the storage device;
- storing, in the storage device, the respective features of the images;
- retrieving, from the storage device, the respective features of training images in the images, wherein the training images are associated with a sub-group of the group of categories of images;
- training a second output layer portion for image classification of the sub-group of the group of categories of images, based on the respective features of the training images and according to classification labels of the training images, wherein the training of the second output layer portion does not comprise training the feature extraction layer portion; and
- generating a second DNN model for image classification of the sub-group of the group of categories of images by combining the feature extraction layer portion and the second output layer portion.

15. The non-transitory computer-readable medium according to claim 14, wherein the first DNN model is training using a subset of the images.

16. The non-transitory computer-readable medium according to claim 14, wherein the operations further comprise:
- receiving a new image; and
- classifying, using the second DNN model, the new image.

17. The non-transitory computer-readable medium according to claim 14, wherein the operations further comprise:
- receiving additional training images;
- extracting, using the feature extraction layer portion, respective features of the additional training images; and
- wherein the training of the second output layer portion comprises training the second output layer portion based further on the respective features of the additional training images.

18. The non-transitory computer-readable medium according to claim 14, wherein the operations further comprise:
- adjusting the feature extraction layer portion and the second output layer portion of the second DNN model based on the training images and the classification labels of the training images.

19. The non-transitory computer-readable medium according to claim 18, wherein adjusting the feature extraction layer portion and the output layer portion of the second DNN model comprises:
- training the second DNN model by using original data of the training images and the classification labels.

20. The non-transitory computer-readable medium according to claim 19, wherein the adjusting the feature extraction layer portion and the output layer portion of the second DNN model comprises using at least one graphics processing unit.

* * * * *